(12) United States Patent
Hall et al.

(10) Patent No.: US 10,576,781 B2
(45) Date of Patent: *Mar. 3, 2020

(54) BICYCLE RIM AND WHEEL HAVING INNER PROTRUSIONS

(71) Applicant: SRAM, LLC, Chicago, IL (US)

(72) Inventors: Michael Hall, Indianapolis, IN (US); David Morse, Indianapolis, IN (US); Ruan Trouw, Mooresville, IN (US)

(73) Assignee: SRAM, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/921,318

(22) Filed: Mar. 14, 2018

(65) Prior Publication Data

US 2018/0201059 A1    Jul. 19, 2018

Related U.S. Application Data

(63) Continuation of application No. 15/042,768, filed on Feb. 12, 2016, now Pat. No. 9,950,561.

(51) Int. Cl.
| | |
|---|---|
| *B60B 21/02* | (2006.01) |
| *B60B 21/04* | (2006.01) |
| *B60B 21/06* | (2006.01) |
| *B60B 1/00* | (2006.01) |
| *B60B 1/04* | (2006.01) |
| *B60B 21/10* | (2006.01) |

(52) U.S. Cl.
CPC ............ *B60B 21/028* (2013.01); *B60B 1/003* (2013.01); *B60B 1/041* (2013.01); *B60B 21/023* (2013.01); *B60B 21/025* (2013.01); *B60B 21/04* (2013.01); *B60B 21/062* (2013.01); *B60B 21/104* (2013.01); *B60B 21/02* (2013.01); *B60B 2900/1216* (2013.01); *Y02T 10/88* (2013.01)

(58) Field of Classification Search
CPC ... B60B 21/028; B60B 21/104; B60B 21/025; B60B 1/003; B60B 21/062; B60B 1/041; B60B 21/04; B60B 21/023; B60B 21/02; B60B 2900/1216
USPC ........................................................ 301/58
See application file for complete search history.

(56) References Cited

U.S. PATENT DOCUMENTS

| | | |
|---|---|---|
| 5,088,665 A | 2/1992 | Vijgen et al. |
| 6,402,256 B1 | 6/2002 | Mercat |
| 6,425,041 B1 * | 7/2002 | Klein .................... G06F 13/362 710/306 |
| 6,425,641 B1 | 7/2002 | Herting |
| 8,757,733 B2 | 6/2014 | Smart |
| 2003/0127907 A1 * | 7/2003 | Chen ...................... B60B 1/041 301/55 |
| 2007/0200422 A1 | 8/2007 | Davis et al. |

(Continued)

FOREIGN PATENT DOCUMENTS

| | | |
|---|---|---|
| CN | 101134422 | 3/2008 |
| CN | 103192663 | 7/2013 |

(Continued)

*Primary Examiner* — S. Joseph Morano
*Assistant Examiner* — Jean W Charleston

(57) ABSTRACT

A rim for a bicycle wheel includes a radially outer tire-engaging portion, a first sidewall, and a second sidewall spaced apart from the first sidewall. The first and second sidewalls may extend radially inward of the radially outer tire-engaging portion. The rim includes a radially inner portion having at least one asymmetric protrusion.

17 Claims, 13 Drawing Sheets

(56) References Cited

U.S. PATENT DOCUMENTS

| | | | |
|---|---|---|---|
| 2008/0054711 A1* | 3/2008 | Dal Pra' | ................ B60B 1/003 |
| | | | 301/58 |
| 2009/0236902 A1 | 9/2009 | Zibkoff | |
| 2009/0322145 A1* | 12/2009 | Rinard | ................... B60B 1/041 |
| | | | 301/58 |
| 2011/0273000 A1* | 11/2011 | Hall | ......................... B60B 5/02 |
| | | | 301/95.101 |
| 2013/0113269 A1 | 5/2013 | Katsanis | |
| 2013/0169026 A1 | 7/2013 | Li | |
| 2014/0292061 A1 | 10/2014 | Lew | |
| 2015/0224820 A1 | 8/2015 | Teixeira | |
| 2015/0361966 A1 | 12/2015 | Mezadourian et al. | |

FOREIGN PATENT DOCUMENTS

| | | |
|---|---|---|
| CN | 103442905 | 12/2013 |
| DE | 3536308 | 4/1987 |
| DE | 20202273 | 6/2002 |
| EP | 0808728 | 11/1997 |
| EP | 1084868 | 3/2001 |
| EP | 1262334 | 12/2002 |
| EP | 1428685 | 6/2004 |
| EP | 1894745 | 3/2008 |
| FR | 2536705 | 6/1984 |
| GB | 2485630 | 5/2012 |

\* cited by examiner

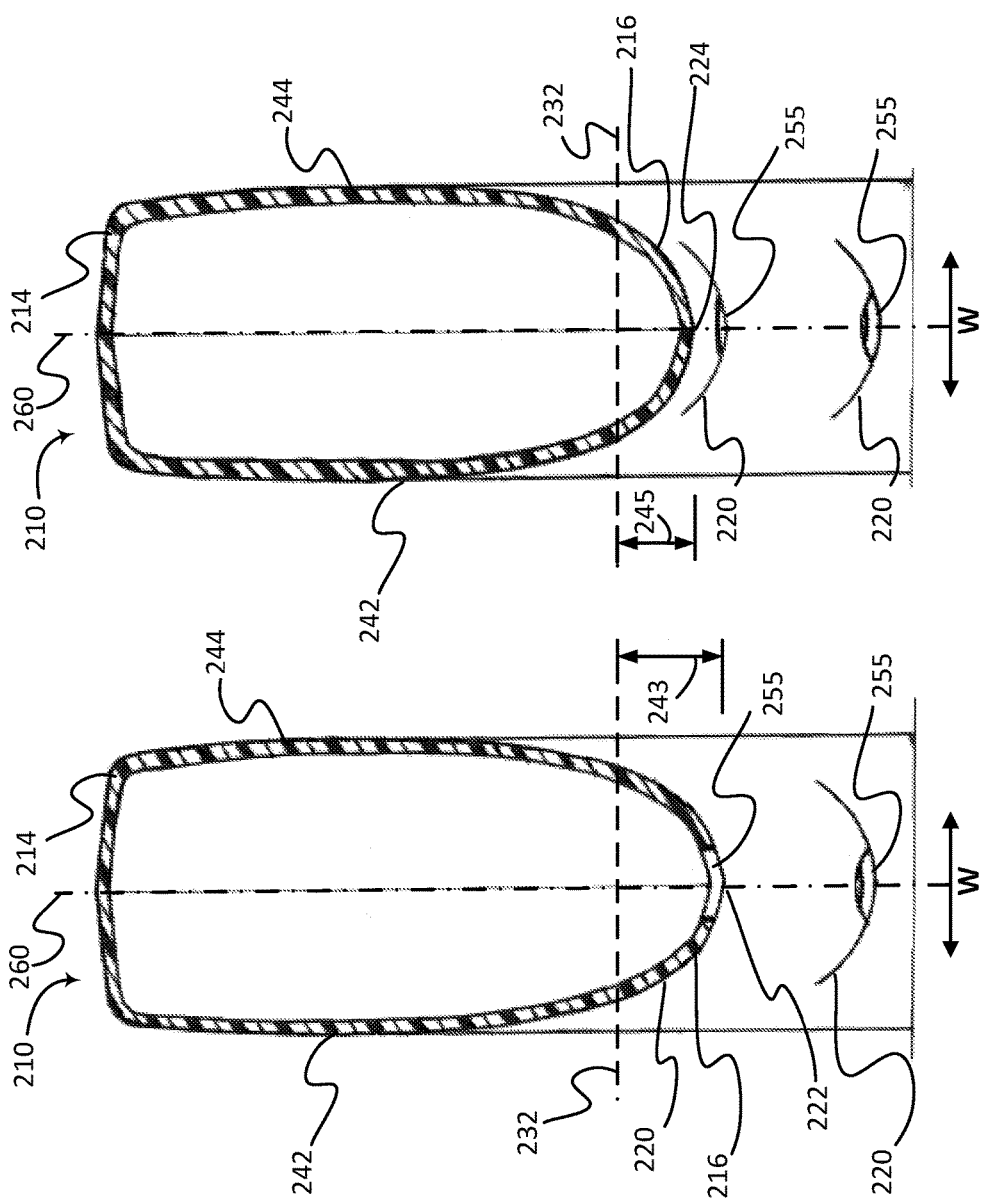

BICYCLE RIM AND WHEEL HAVING INNER PROTRUSIONS

This application is a continuation of U.S. patent application Ser. No. 15/042,768, filed Feb. 12, 2016, the contents of which are herein incorporated in their entirety.

BACKGROUND OF THE INVENTION

A traditional bicycle wheel may include a rim formed of extruded metals or other materials that are bent and bonded into a circular shape having consistently shaped cross sections. Recently other materials, such as fiber reinforced plastics, have been used in the manufacture of bicycle rims, which may be formed into circular shapes through non-extrusion based processes.

Wheel rims generally may experience aerodynamic issues during use with a bicycle. For example, traditional cross-sectional shapes of bicycle wheel rims may cause a large amount of drag on the wheel when moving in a straight forward direction (i.e. zero degree wind yaw or approach angle), which will inhibit the forward motion of the bicycle. Also, the movement of surrounding air through the wheel when air approaches the wheel at an angle relative to the forward direction of the bicycle (i.e. non-zero degree or transverse wind yaw or approach angle) may cause a resultant transverse force on the wheel. If this force is applied at a location forward or rearward of the wheel steering axis, a moment about the steering axis of the bicycle may result. Airflow across bicycle rims at transverse angles is believed to result in a loss of attached flow around the wheel at certain wind yaw angles relative to a forward movement direction of the bicycle. The resultant transverse forces of this detached flow result in bicycle handling issues, as well as increased drag. The yaw angle at which flow around a wheel becomes detached is a stall point.

Reduction of zero yaw angle aerodynamic drag, as well as altering the stall point to reduce non-zero yaw angle aerodynamic drag and transverse forces that act on a wheel, can provide for a more controllable and better performing bicycle.

SUMMARY

In an embodiment, a rim for a bicycle wheel includes a radially outer tire-engaging portion, a first sidewall, a second sidewall spaced apart from the first sidewall, the first and second sidewalls extending radially inward of the radially outer tire-engaging portion. The rim also includes a radially inner portion comprising a spoke receiving surface disposed along an inner circumference of the rim, wherein at least one protrusion is formed in the spoke receiving surface asymmetrically about a radial centerline of the at least one protrusion in a circumferential direction of the rim.

In an embodiment, a wheel for a bicycle includes a central hub configured for rotational attachment to the bicycle and a plurality of spokes attached to the central hub and extending radially outward from the hub, the plurality of spokes consisting of a number of spokes. The wheel also includes a rim having a radially outer tire-engaging portion, a first sidewall, a second sidewall spaced apart from the first sidewall, the first and second sidewalls extending radially inward of the radially outer tire-engaging portion, and a radially inner portion disposed along an inner circumference of the rim comprising a plurality of asymmetric protrusions that protrude inwardly of the rim and are formed in a radially inner surface of the radially inner portion, wherein a quantity of the plurality of asymmetric protrusions is equal to or greater than the number of spokes.

BRIEF DESCRIPTION OF THE DRAWINGS

FIGS. 6A-6B show cross sectional views of the rim of FIG. 4;

Other aspects and advantages of the embodiments disclosed herein will become apparent upon consideration of the following detailed description, wherein similar or identical structures have similar or identical reference numerals.

DETAILED DESCRIPTION

A bicycle wheel may have a rim with particularly configured protrusions propagated along an inner circumference of the rim. The protrusions are specifically shaped to reduce aerodynamic drag and transverse forces of the wheel. The protrusions may be asymmetric with respect to one or more axes of the bicycle wheel. For example, the protrusions may be asymmetrically formed along a circumferential direction of the wheel. Wind tunnel testing has shown that rims with asymmetric protrusions along the inner circumference experience a 10% reduction in drag forces over similarly sized rims without protrusions. Similar results have been proven over rims having symmetric protrusions.

The asymmetric protrusions may be tubercles, or rounded protuberances or lobes that alter the flow-field around an airfoil or other object. Tubercles, a pattern of aerodynamic features first studied on humpback whale fins, are believed to increase a stall angle and mitigate losses in post-stall performance of airfoils operating in variable flow conditions. Wind tunnel testing of streamlined bicycle rims employing symmetric protrusion airfoil cross-sections has shown them to be ineffective at altering the stall angle or reducing longitudinal drag, the two main performance criteria for aerodynamic bicycle wheels. These symmetric protrusion wheel designs failed to account for wheel rotation in addition to wheel translation through space as it is ridden, and employ protrusions whose amplitude, wavelength, and symmetric shape and/or orientation may be sub-optimal.

An asymmetric tubercle pattern of appropriate amplitude, wavelength, shape, and/or orientation can account for the complex flow patterns experienced over a rotating and translating airfoil, such as those experienced by a bicycle wheel in use. Asymmetric tubercle profiles, as are described herein, may serve to form more powerful stream-wise vortices over the rim, particularly on the downstream half of the wheel. These stream-wise vortices are considered a cause of attached airflow in tubercle-modified airfoils operating at angles near the stall point. Such attached flow is what may define an effective airfoil with desirable performance properties.

Also, aside from stream-wise vortex development, asymmetric tubercles may cause oscillating span-wise vortices to be shed in the wake of the rim, on regular intervals. The frequency of this shedding is the Strouhal Number of an aerodynamic object as it moves through space. The spacing, number, shape, and/or orientation of the tubercles may induce a beneficial Strouhal Number in the wake of the rim, and these factors can be used to create desirable shedding frequencies that minimize the amplitude and effect of wake vortices on wheel handling characteristics. In general, higher Strouhal Numbers indicate a relatively lower amplitude and impulse of each individual vortex.

Figure 1:
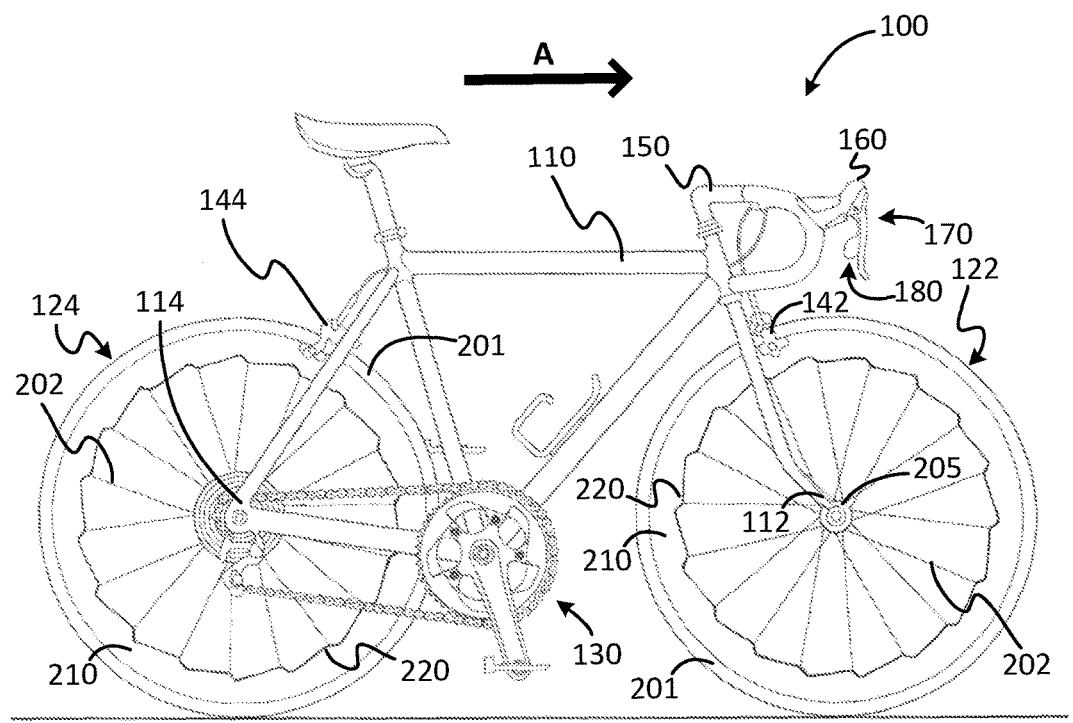
FIG. 1 is a side view of a bicycle, which may be used to employ a rim having protrusions.

FIG. 1 generally illustrates a bicycle 100 with which bicycle wheels 122, 124 having an inner circumference that includes asymmetric tubercles may be used. The bicycle 100 includes a frame 110, front and rear wheels 122, 124 rotatably attached to the frame 110, and a drivetrain 130. The frame 110 includes wheel mounting portions 112, 114 to attach the front wheel 122 and the rear wheel 124, respectively.

A front brake 142 is provided for braking the front wheel 122, and a rear brake 144 is provided for braking the rear wheel 124. The front and/or forward orientation of the bicycle 100 is indicated by the direction of arrow "A." As such, a forward direction of movement for the bicycle is indicated by the direction of arrow A.

While the illustrated bicycle 100 is a road bike having drop-style handlebars 150, the present invention has applications to bicycles of any type, including fully or partially suspensioned mountain bikes and others, as well as bicycles with mechanically controlled (e.g. cable, hydraulic, pneumatic) and non-mechanical controlled (e.g. wired, wireless) drive systems.

The bicycle 100 may include one or more bicycle control devices 160, mounted to handlebars 150. The bicycle control devices 160 may include one or more types of bicycle control and/or actuation systems. For example, the bicycle control devices 160 may include brake actuation systems 170 to control the front and/or rear brakes 142, 144, and/or gear shifting systems 180 to control the drivetrain 130. Other control systems may also be included. For example, the system may be applied, in some embodiments, to a bicycle where only a front or only a rear gear changer is used. Also, the one or more bicycle control devices 160 may also include suspension and/or other control systems for the bicycle 100.

Figure 2:
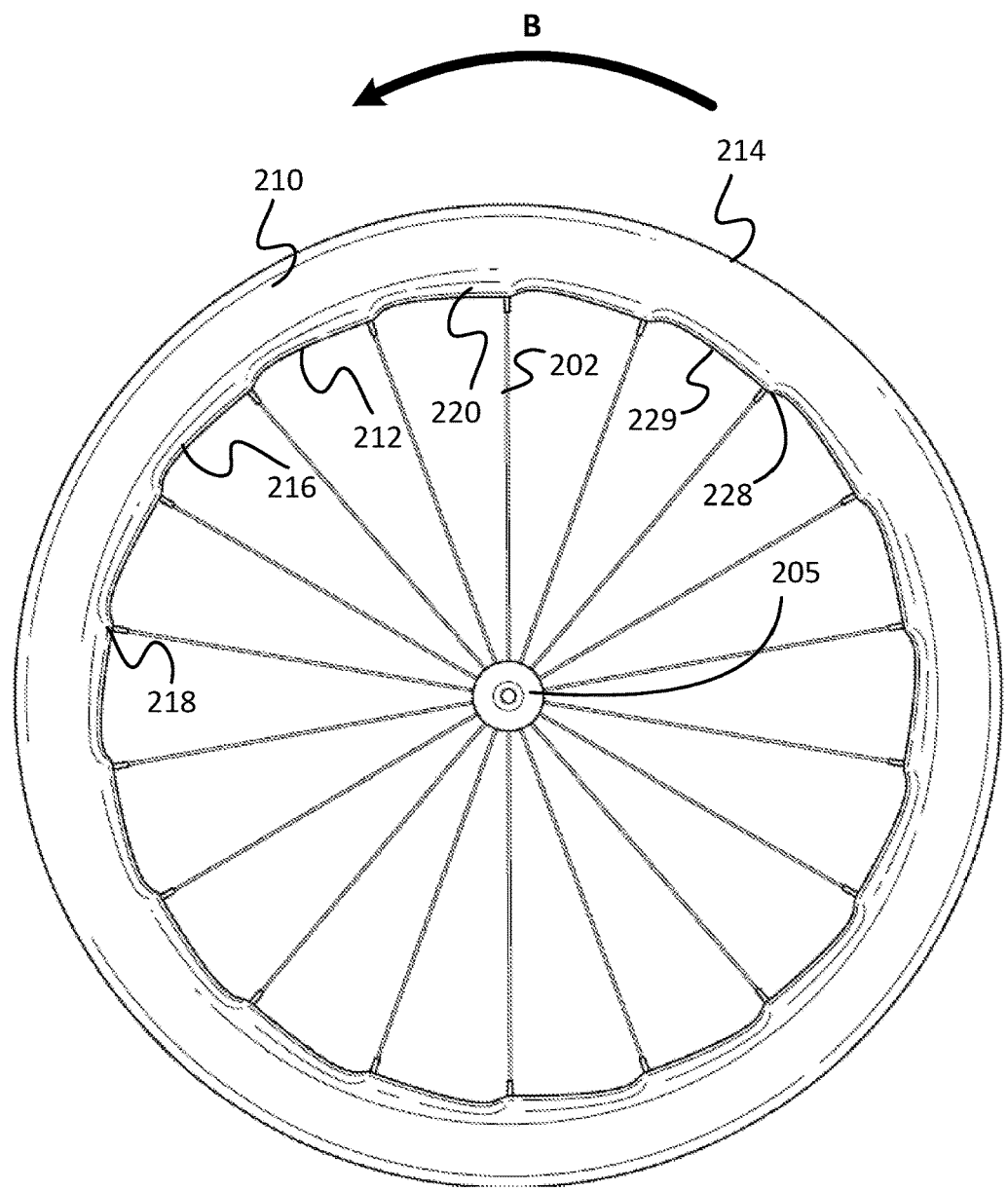
FIG. 2 illustrates a side view of a wheel for a bicycle, such as the bicycle of FIG. 1.

As can be seen in FIGS. 1 and 2, the front and/or rear wheel 122, 124 of the bicycle 100 may include a tire 201, attached to a radially outer tire engaging portion of a rim 210. A plurality of spokes 202 are attached directly to the rim 210. Alternatively, the spokes 202 may be attached and/or secured to the rim 210 with other structural components. The spokes 202 extend from the rim 210 and attach to a central hub 205. The spokes 202 are maintained with a tension between the rim 210 and the hub 205 to provide the wheel 122, 124 with an operational rigidity for use on the bicycle 100. The hub 205 is configured for rotational attachment to the bicycle frame 110. The rim 210 of the wheel 122, 124 may include one or more protrusions 220 along an inner circumference configured for aerodynamic benefit of the wheel 122, 124 as used on the bicycle 100. FIGS. 2-8 provide illustrations of bicycle a rim 210 having rounded aerodynamic protrusions 220, or tubercles, forming an inner circumference 212 of the rim 210.

FIG. 2 provides an illustration of the rim 210, spokes 202, and hub 205 of the front wheel 122, removed from the rest of the bicycle 100. The rim 210 also includes a tire engaging portion 214 to engage with the tire 201, as is shown in FIG. 1. The tire engaging portion 214 is configured radially outward of a spoke receiving surface 216 that is disposed along an inner circumference 212 of the rim 210. As shown, the tire engaging portion 214 is configured for attachment to tires using adhesive or other techniques, such as are used in tubular bicycle tire attachment. Other configurations of the tire engaging portion 214 may also be provided to allow for the use of other types of tires on the rim 210. For example, clincher tire attachment configurations for tires including beaded interlock attachment may be used.

The rim 210 provides structure for attachment of the spokes 202 to the rim at a receiving portion of the rim, proximate to the spoke receiving surface 216. As such, the spoke receiving surface 216 is part of a spoke engaging portion 218 of the rim 210. In an embodiment, the spoke receiving surface 216 and the spoke engaging portion 218 may be separate parts and/or portions of the rim 210. For example, the spokes 202 may pass through the spoke receiving surface 216 and the structure for attachment to the rim 210 may be provided proximate to the tire engaging portion 214. The rim 210 may be formed of any material. For example, carbon-fiber reinforced plastic, aluminum, and/or other materials may be used. In an embodiment, carbon-fiber reinforced plastic forms a one-piece unitary rim of a singular material including the tire engaging portion 214, two sidewalls, and the spoke engaging portion 218 (e.g. the embodiment illustrated in FIGS. 6A and 6B). In another embodiment, both aluminum and carbon-fiber reinforced plastic may be used to form the rim 210. For example, the tire engaging portion 214 may be formed of aluminum, while one or more of the sidewalls and spoke engaging portion 218 may be formed of carbon-fiber reinforced plastic. Further, individual portions of the rim 210 may be formed of multiple materials. For example, the sidewalls and/or the tire-engaging portion may be formed of both aluminum and carbon-fiber reinforced plastic. Other configurations may also be used.

The protrusions 220 may be asymmetrically formed on the inner circumference of the rim 210. The protrusions 220 may be asymmetric along an axial direction, a circumferential direction, or both. Further, the spoke receiving surface 216 may be configured to receive at most one ("1") spoke for every asymmetric protrusion 220 included therein. In an embodiment, such as that illustrated in FIG. 2, the protrusions 220 are disposed evenly around the inner circumference 212 of the rim 210. The plurality of protrusions 220 may also have the same, similar, or different configurations and/or dimensions.

The wheels 122, 124 may include rims 210 configured for any size wheel. In an embodiment, the rims 210 are configured for use in wheels conforming to a 700C (e.g. a 622 millimeter diameter clincher and/or International Standards Organization 622 mm) bicycle wheel standard.

The wheels 122, 124 may rotate about the hub 205 in either direction. For example, as shown in FIG. 2, the wheels 122, 124 may be configured to rotate in a particular rotational direction B about the hub 205. As such, the protrusions 220 may include a first, or leading, face 229 and a second, or trailing, face 228 as the rim 210 moves through surrounding air in both the particular rotational direction B and the linear translation direction A. In another embodiment, the wheels 122, 124 may be configured to rotate in a direction opposite the particular rotational direction B.

Figure 3A:
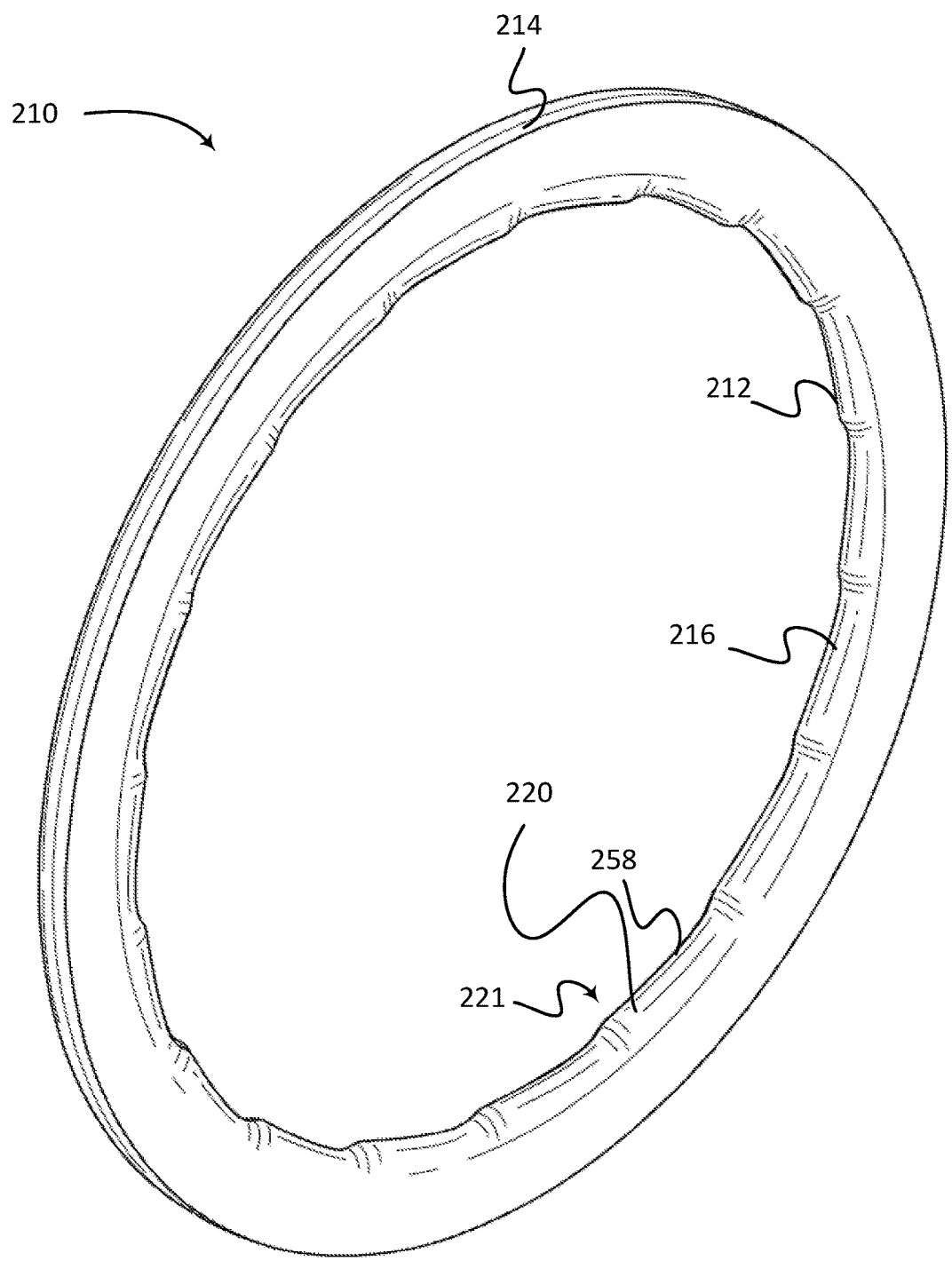
FIG. 3A is a perspective view of a rim having protrusions.
Figure 3C:
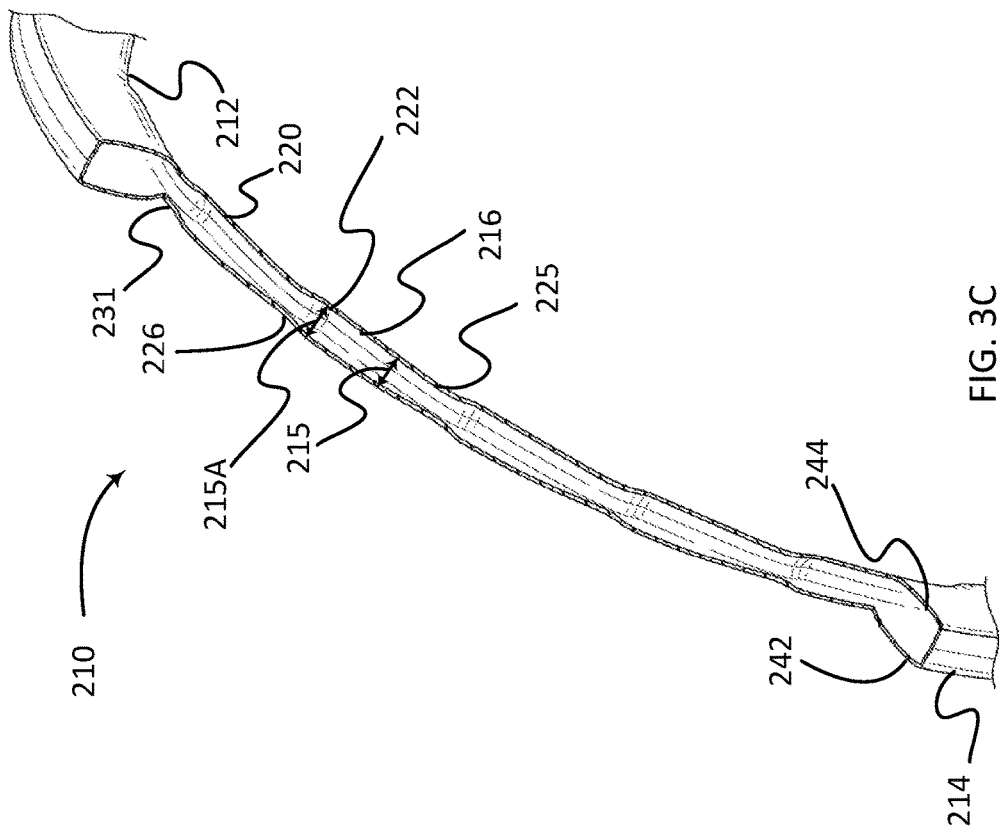
FIGS. 3B-3C illustrate sectional views of the rim of FIG. 3A.
Figure 3B:
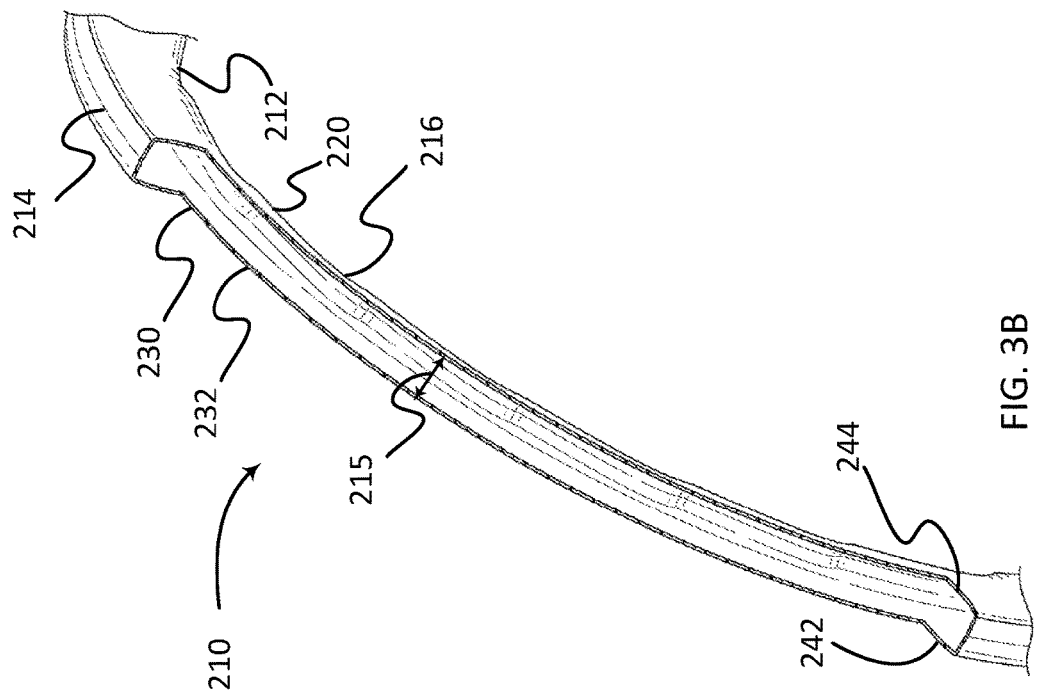

FIGS. 3A-3C illustrate the rim 210 with the spoke receiving surface 216 having asymmetric protrusions 220 formed therein. The spoke receiving surface 216 will include holes to receive spokes. As shown, holes for receiving spokes at the spoke receiving surface 216 are removed for clarity. The protrusions 220 are formed integrally with the spoke receiving surface 216, and cannot be separated therefrom. As such, the spoke receiving surface 216 is further defined by the shape of the protrusions 220. The spoke receiving surface 216 may include a crest area 221 that includes a peak of the protrusion. The crest area 221 may be a continuous rounded area of the continuous spoke receiving surface 216. The crest area 221 may form a convex curved surface in the circumferential and/or axial directions of the rim 210. Also, the spoke receiving surface 216 may be formed as a surface having a convex curved surface in the axial direction about the inner circumference 212 of the rim 210. The convex curve of the surface may run throughout the axial width of the spoke receiving surface 216 and/or the rim 210

FIG. 3B illustrates a sectional view of the rim 210 taken from a circumference 232 at a base diameter 230. An axial width 215 to the external surface of the rim 210 may indicate the spoke receiving surface 216. This axial width may be between a first sidewall 242 and a second sidewall 244 of the rim 210. The base diameter 230 is a diameter of the rim 210 at which the axial width 215 of the rim 210 is constant, or essentially constant, along the entire circumference of the rim 210, allowing for minor variance due to manufacturing processes and/or errors. The spoke receiving surface 216 extends inward of the base diameter 230 towards the center of the rim. FIG. 3C illustrates a sectional view of the rim 210 taken from a circumference 239 at an inward diameter 231 of the rim 210 from the base diameter 230 (see also FIG. 5C). At this diameter 231, and other diameters less than the base diameter 230, the view intersects the spoke receiving surface 216 such that the width 215 of the rim varies around the circumference of the rim 210. In an embodiment, the external width of the protrusion 220 varies from a first position of the protrusion 224 to a second position of the protrusions 226, for example a beginning end and ending end of the protrusion. Further, the widest part or width 215A of the protrusion 220 may be at or near a peak position 222 of the protrusion 220. Circumferential asymmetry of the protrusion 220 may be evident in that the widest part of the protrusion 220 is closer to one end of the protrusion than the other.

Figure 6C:
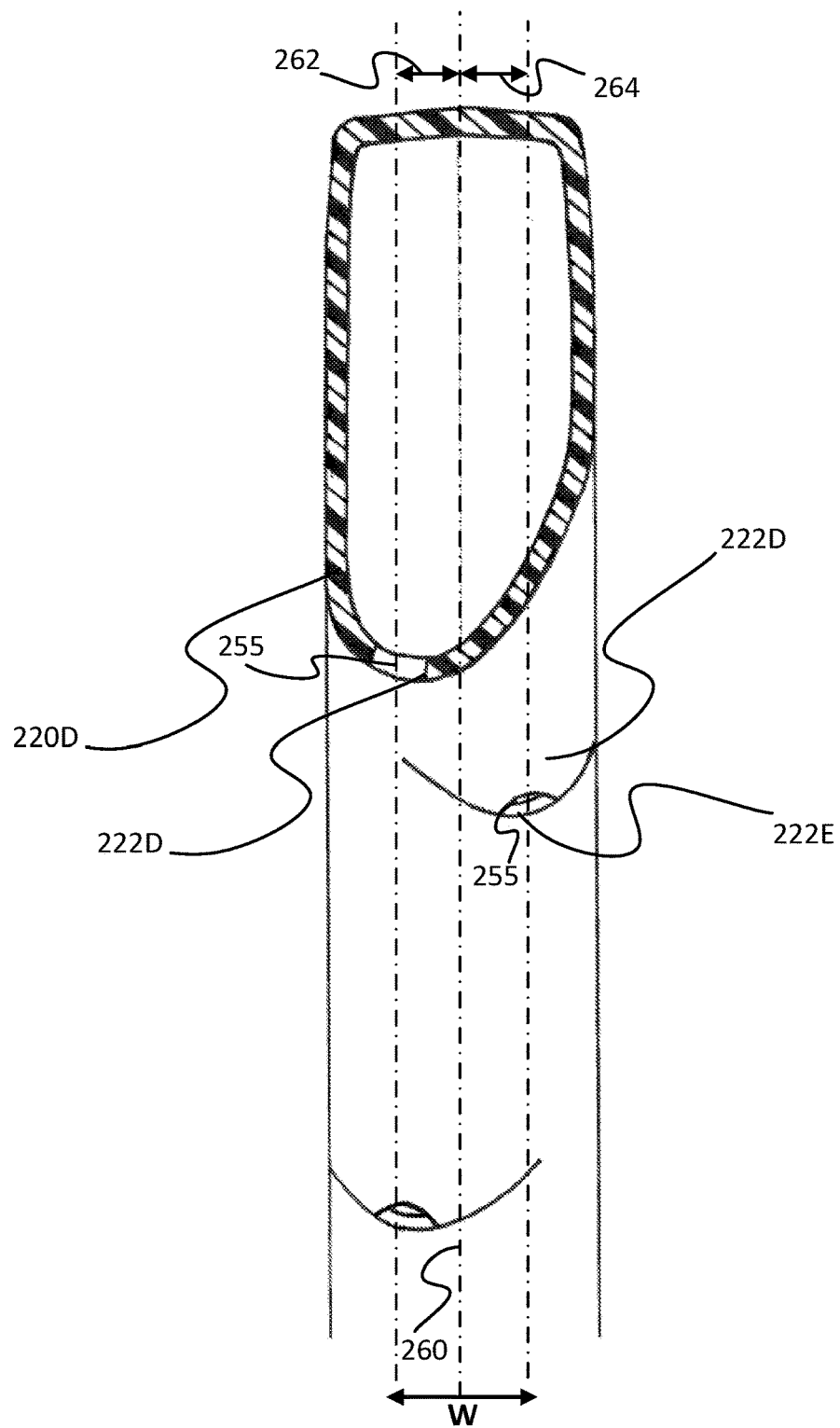
FIG. 6C illustrates a cross sectional view of a rim having axially asymmetric protrusions.

In an embodiment, such as those shown in FIGS. 6A-6C, the spoke receiving surface 216 is attached to the rest of the rim (e.g. the sidewalls) such that the rim profile is formed of a single piece construction. The rim 210 may be formed of a single material having thin walls. Further, specific areas and/or positions of the walls of the rim 210 may be thicker or thinner based on structural requirements of the rim 210. In an embodiment, the protrusion 220 may have thicker walls than sidewalls and/or the tire engaging portion 214 of the rim 210. For example, the protrusion 220 may include structure and/or added material for the attachment of spokes.

Figure 4:
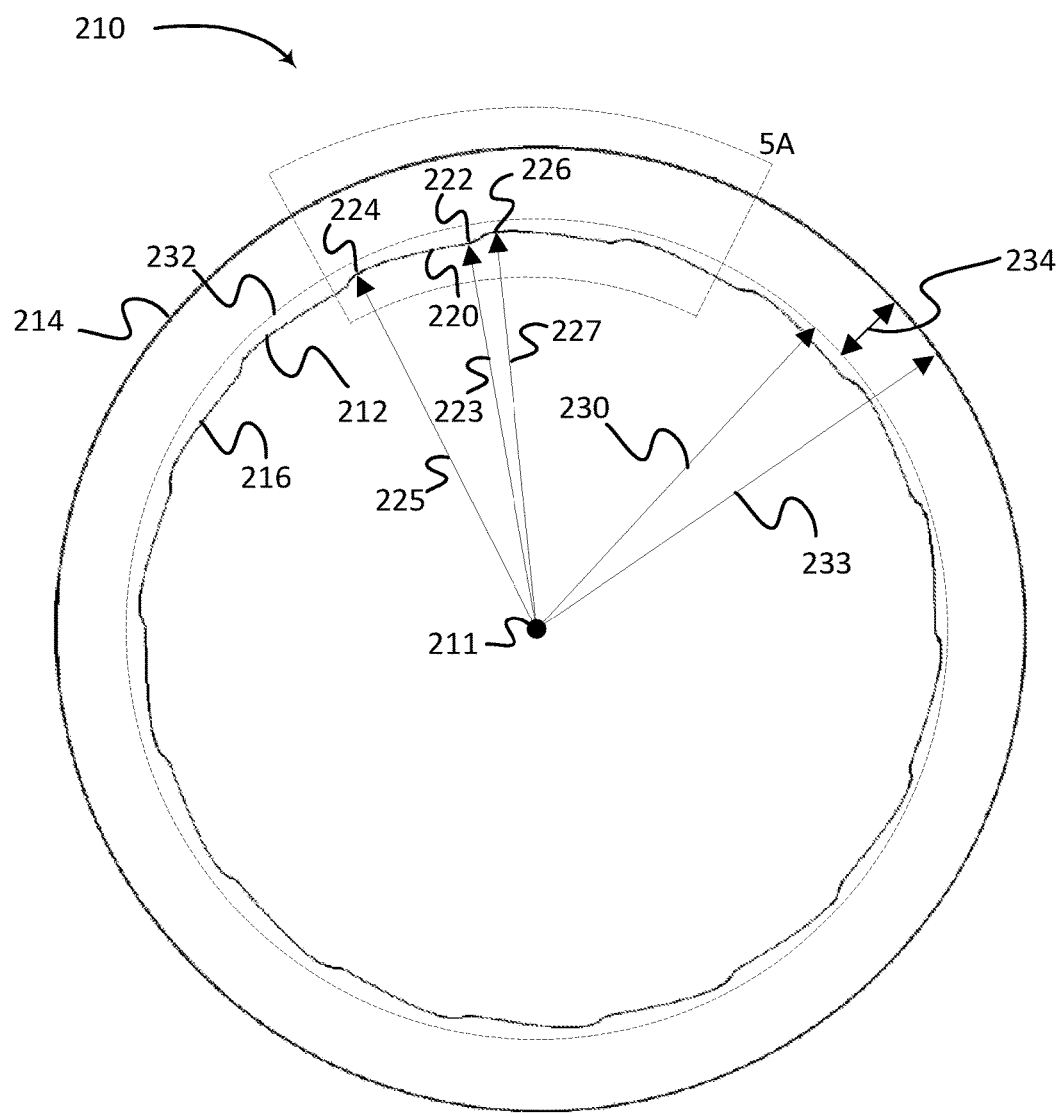
FIG. 4 illustrates a side view of the rim of FIGS. 3A-3C.
Figure 5A:
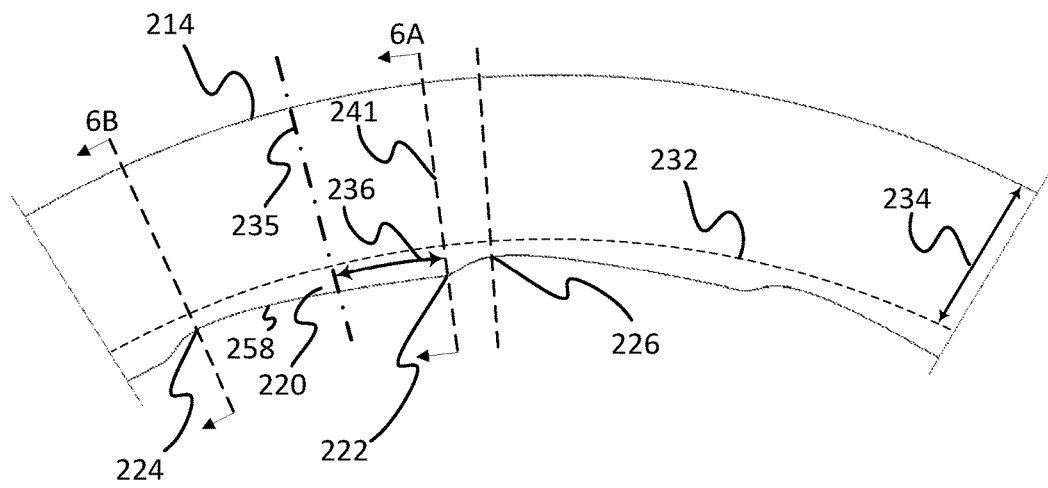
FIGS. 5A-5C illustrate expanded views of the rim of FIG. 4.
Figure 5B:
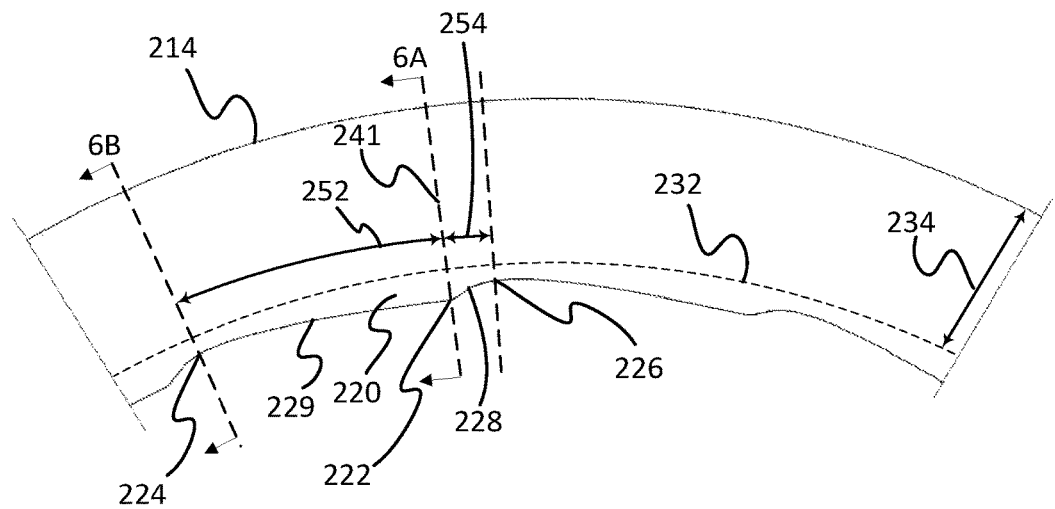

FIG. 4 and FIGS. 5A-5B show the features of the rim 210, as referenced by the base diameter 230 (a radius of the base diameter 230 is shown in FIG. 4), the circumference 231 at the base diameter 230, a rim center 211 and the rim outer diameter 233 at the tire engaging portion 214 (a radius of the outer diameter 233 is shown in FIG. 4). As can be seen from FIG. 4, the base diameter 230 is set apart from the outer diameter 233 by a radial distance 234.

The protrusion 220 runs along the inner circumference 212 of the rim 210 from the first position 224 to the second position 226. The protrusion 220 includes a crest point and/or region at or about a peak position 222. The peak position 222 provides an innermost edge of the protrusion 220 at a third (e.g. peak) radial distance 223 from the center 211 of the rim 210. The first position 224 provides an innermost edge of the protrusion 220 at a first radial distance 225 from the center 211 of the rim 210. The second position 226 provides an innermost edge of the protrusion 220 at a second radial distance 227 from the center 211 of the rim 210. The first and second radial distances 225, 227 are less than the third or peak radial distance 223. In an embodiment, the first and second radial distances 225, 227 are equal. In an alternative embodiment, the first and second radial distances 225, 227 are not equal. Further, as shown, the first and second positions 224, 226 of the protrusion 220 may form a first or second position of an adjacent protrusion in the spoke receiving surface. This pattern is repeated around the inner circumference 212 of the rim to form a continuous sequence of protrusions in the spoke receiving surface 216. In an embodiment, the first position 224 and the second position 226 define the beginning and ending points of the protrusion 220.

In an embodiment, at least one protrusion 220 extends between the first position 224 on the inner circumference 212 of the rim 210 and the second position 226 on the inner circumference 221 of the rim 210, and has a peak position 222 disposed between the first position 224 and the second position 226. Also, the inner circumference 212 has a first radial value 225 at the first position 224, a second radial value 227 at the second position 226, and a third radial value 223 at the peak position 222, the third radial value 223 being less than the first radial value 225 and the second radial value 227. Further, in an embodiment, the third radial value 223 is a smallest radial value of the inner circumference 212 of the rim 210 between the first position 224 and the second position 226.

Figure 5C:
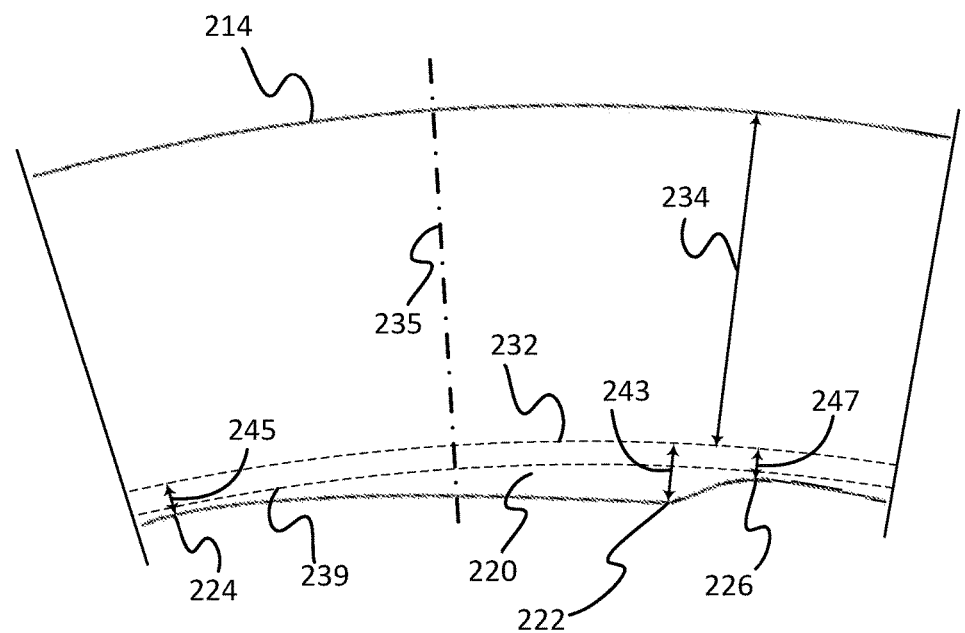

FIGS. 5A and 5B show the outlined section of FIG. 4, and FIG. 5C shows an expanded view of the area of the rim 210 about the first and second positions 224, 226 of the protrusion 220. The peak position 222 is set a first circumferential distance 252 from the first position 224, and a second circumferential distance 254 from the second position 226. The first circumferential distance 252 is different than the second circumferential distance 254. Thus, the protrusion is asymmetrically configured about a line 241 running through the peak position towards the center 211 of the rim 210. The asymmetric configuration may also, or alternatively, be indicated by an asymmetric circumferential orientation about a centerline 235 of the protrusion 220. Such an indication may be used for single position peak protrusions and may also further indicate embodiments having asymmetric protrusions having a peak plateau, region, or area wherein multiple positions on the protrusion have a smallest radial distance from the protrusion surface to the center of the rim. The centerline 235 may be a radial centerline and located circumferentially equidistant between the first and second positions 224, 226 (e.g. end positions) of the protrusion 220, and the peak position 222 may be located a circumferential distance 236 away from the protrusion centerline 235. The asymmetric configuration may also, or alternatively, be indicated by an amount of volume of the protrusion that exists on one side of the protrusion centerline 235, verses an opposing side of the protrusion centerline 235.

In an embodiment, the first circumferential distance 252 is 80% or less of the second circumferential distance 254. For example, the first circumferential distance 252 may be 60%-65% of the second circumferential distance 254. In another example, the first circumferential distance 252 may be less than 30%, such as 25%-30% of the second circumferential distance 254. In yet another example, the first circumferential distance 252 may provide a blunt face with a very small ratio of circumferential distances, for example the first circumferential distance 252 may be less than 10% of the second circumferential distance 254. The circumferential distance may be measured at any diameter of the rim, however, the first circumferential distance 252 and the second circumferential distance 254, as well as other comparative circumferential distances, are measured at a same diameter to ensure relative referential scale. Also, in an embodiment where the first position 224 is one end of a protrusion 220, and the second position 226 is the other end of a protrusion, a length of the protrusion may be the first circumferential distance 242 added to the second circumferential distance 244.

The protrusion 220 also includes a first face 229 and a second face 228 defined by the surface 258 of the protrusion 220 between the peak position 222 and the first or second positions 224, 226. The profile view of the first and second faces 229, 228, as seen in FIGS. 5A and 5B, take the form of a curve at the surface. These faces 229, 228 may have a convex shaped profile in the axial width direction W of the rim 210. For example, the faces 229, 228 may have a continually convexly curved surface from one edge of the spoke receiving surface 216 to another axially opposing edge of the spoke receiving surface 216.

The protrusion 220 may have a height at the peak position 222 that is the radial, or peak, distance 243 from the innermost edge of the inner circumference of the rim 210 at the peak position 222 to the circumference 232 of the rim at the base diameter 230. This may be the peak height of the spoke receiving surface 216. Similarly, the first and second positions 224, 226 may have a first height 245 and a second height 247 of the spoke receiving surface 216. As is shown, the peak height will be greater than the first height 245 and the second height 247. In an embodiment, the first height 245 and the second height 247 are equal. In another embodiment, the first height 245 and the second height 247 are not equal.

Figure 5D:
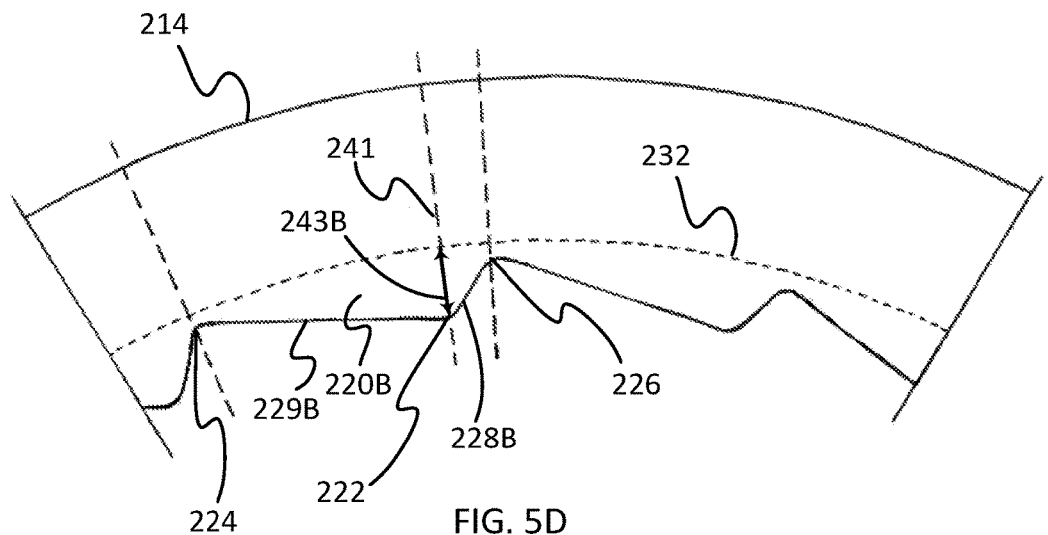
FIGS. 5D-5E illustrate embodiments of protrusions for the rim of FIG. 4.
Figure 5E:
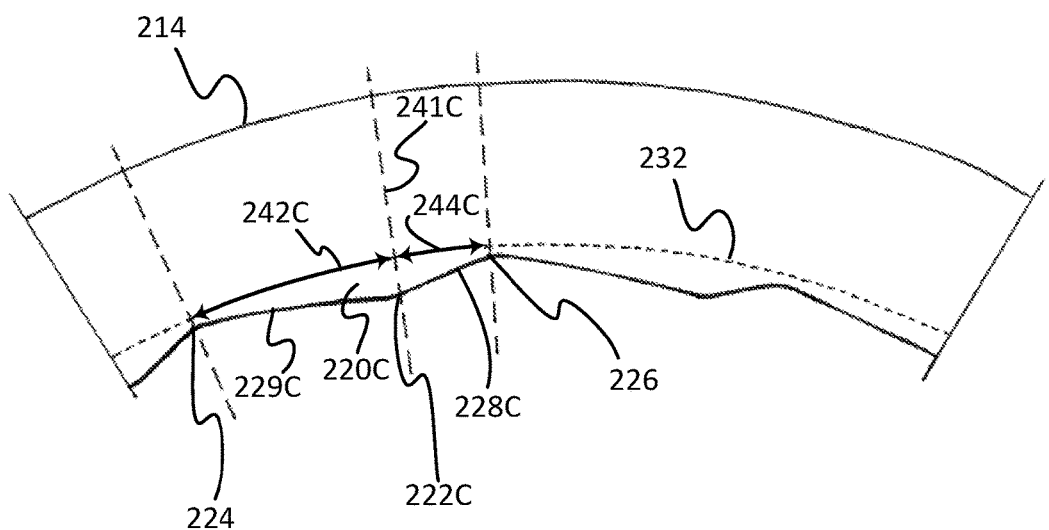

FIGS. 5D and 5E illustrate alternate embodiments of the protrusion 220 and/or spoke receiving surface. FIG. 5D shows a protrusion 220B that has an increased amplitude 243B along with differently oriented protrusion faces 229B, 228B. FIG. 5E shows a protrusion 220C that has a peak position 222C moved closer to the protrusion center, thus having different first and second distances 242C, 244C from the first position 224 and the second position 226 respectively.

FIGS. 6A and 6B are cross sectional views of the rim 210 taken at 6A and 6B of FIG. 5A. The views show the radially outer tire-engaging portion 214, the first sidewall 242, and the second sidewall 244. The first sidewall 242 is spaced apart from the second sidewall 244. In this embodiment the first sidewall 242 is spaced apart from the second sidewall 244 an axial distance creating the axial width 215 of the rim 210 in an axial direction W. Also shown is a radially inner portion that includes the spoke receiving surface 216 disposed along the inner circumference 212 of the rim 210. At least one protrusion 220 is formed in the spoke receiving surface 216. The protrusion 220 is asymmetrically formed in the circumferential direction of the rim 210. In the displayed embodiment the protrusion 220 is symmetric about an axial centerline 260 of the rim 210, with the protrusion 220 of the convex spoke receiving surface 216 evenly disposed about the axial centerline 260. Further, the peak position 222 of the protrusion 220 is axially located on the rim centerline 260.

In an embodiment, the spoke receiving surface 216 forms a convex curve in an axial direction W across the width of the spoke receiving surface 216 and the rim 210. As shown, this convex curve is continuous and smooth across the width of the spoke receiving surface and the rim 210, and as such includes no discontinuities in the curve aside from the holes 255 for receiving spokes. In an embodiment, the convex curve may not have a same radius of curvature throughout the width, but the curve may still be smooth. Also, in this embodiment, a radial distance of the inner diameter at the spoke receiving surface 216 along the axial width varies continuously and symmetrically about a bisecting plane or axial centerline 260 perpendicular to the axial direction W. The peak position 220 may be axially located within the bisecting plane and/or axial centerline 260.

As shown, the spoke receiving surface 216 also includes at least one hole 255 formed therein. The hole 255 is a hole for receiving a spoke. In this embodiment, the at least one hole 255 is formed at the peak position 222 of the protrusion 220. In other embodiments holes may be at other positions of the protrusion 220 and/or spoke receiving surface 216. Further, in the displayed embodiment each protrusion includes at most one ("1") hole 255. In an embodiment, such as is provided with respect to FIG. 8, less than one ("1") hole per protrusion may be included in the spoke receiving surface.

FIG. 6C illustrates an embodiment that includes protrusions formed asymmetrically about the rim axial centerline 260. In the displayed embodiment, at least one protrusion 220 D is formed with a peak position 222D a first distance 262 to one axial side of the centerline 260, and at least one protrusion 220E is formed with a peak position 222E a second distance 264 to the other axial side of the centerline 260. The first distance 262 may or may not be equal to the second distance 264. In an embodiment, all of the protrusions have peak positions the same distance removed from the axial centerline. In an embodiment, all of the protrusions are disposed on the same side of the centerline. In an embodiment, a plurality of protrusions have peak positions on one side of the axial centerline, and at least one protrusion has a peak position on another side of the axial centerline.

Additionally, or alternatively, the protrusion 220D may be determined axially asymmetric if a larger volume of the protrusion is contained on one side of the axial centerline 260 than the other. In another embodiment, the peak positions of axially asymmetric protrusions are located on the axial centerline, however the configuration of the protrusion provides for the axial asymmetry. For example, a larger volume of the protrusion may lie on one side of the axial centerline 260 than the other.

In an embodiment, spoke receiving holes 255 of the spoke receiving surface 216 may be disposed on the protrusions at different sides of the axial centerline 260. For example, the holes 255 may be disposed at peak positions of axially asymmetric protrusions disposed on differing sides of the rim centerline 260.

Figure 7A:
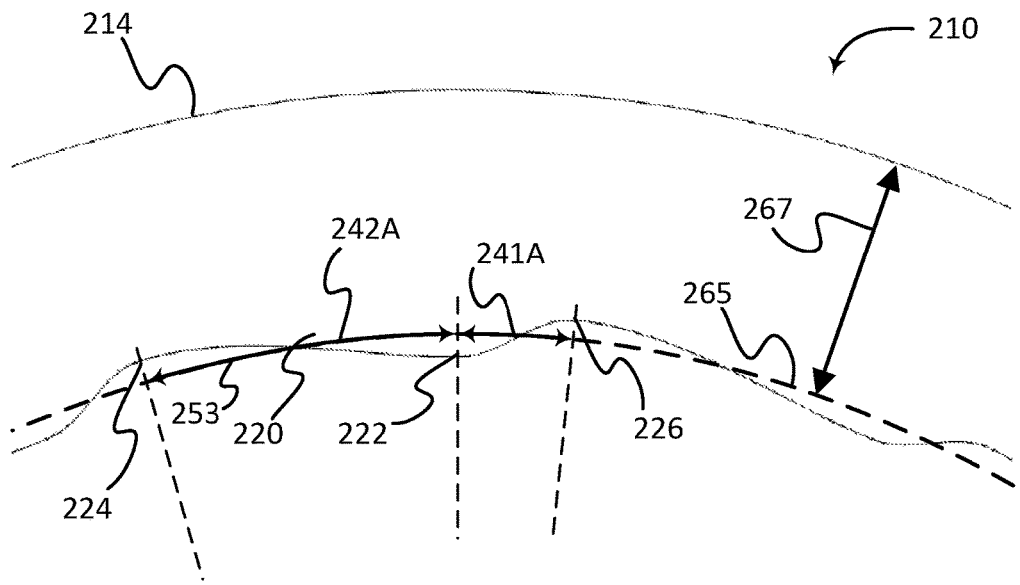
FIGS. 7A-7B illustrate the geometry of a protrusion.
Figure 7B:
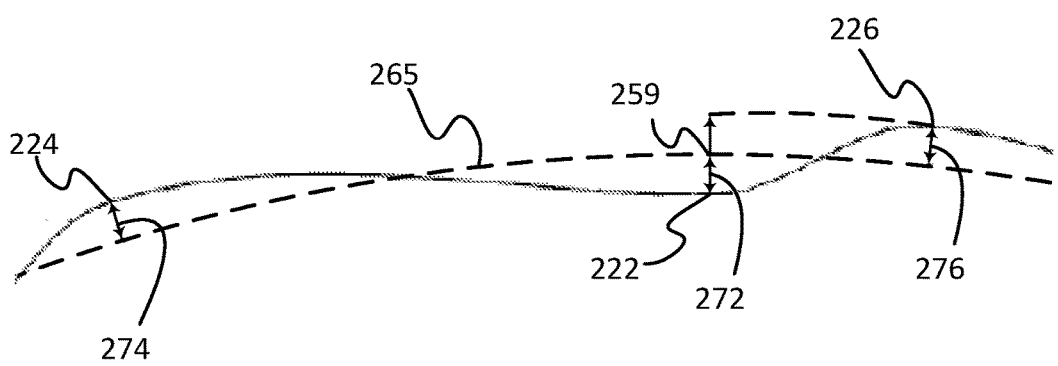

FIGS. 7A and 7B show the inner contour of the inner spoke receiving surface with respect to an average depth circumference 265 at an average diameter for the rim 210, determined based on the external surface configuration. The average diameter may be determined by taking an average of the radial distance 223 of the rim 210 at the peak position 222, and a radial distance at a trough position (e.g. the first or second positions 224, 226) 225, 227. A distance from the average diameter to the tire engagement portion 214 may be an average rim depth 267.

The average rim depth 267 may be used to radially position the protrusions 220 such that the protrusions are in an airflow region of the wheel to provide the most beneficial effect. In an embodiment, the average rim depth 267 is 30 millimeters or greater. For example, the average rim depth 267 may be between 40 millimeters and 45 millimeters, or between 80 millimeters and 85 millimeters.

The protrusion 220 may be described with reference to the average rim depth 267. As was described above, the peak position may be separated from a first, or beginning, position 224 of the protrusion 220 by a first distance along the circumference, such as the average depth circumference 265, at the largest diameter 242A, and a second, or end, position 226 of the protrusion 220 by a second distance along the circumference at the largest diameter 241A. The first distance 242A is not equal to the second distance 241A, and thus the protrusion 220 is asymmetric along the circumferential direction (e.g. direction B of FIG. 2) of the rim 210. Also, the peak position 222 on the surface of the rim 210 is a peak radial distance 272, or peak amplitude, from the average depth circumference 265. Also, the first position 224 at the surface and the second position 226 at the surface are separated from the average depth circumference 265 by a first trough radial distance 274, or first trough amplitude, and a second trough radial distance 276, or second trough amplitude, respectively. In an embodiment where the first radial trough distance 274 and the second radial trough distance 276 are equal, the peak radial distance 272 may also be equal. Also, the peak amplitude 272 may be any value. In an embodiment, the peak amplitude is 2.5 millimeters. Also, the trough amplitudes 274, 276 may be any value. In an embodiment the trough amplitudes 274, 276 are equal to the peak amplitude 272. For example, the peak and trough amplitudes 272, 274, 276 may each be 2.5 millimeters.

In an embodiment, the rim 210 may include a plurality of continuous protrusions 220, each having a same protrusion length 253. The protrusion length 253 may be the circumferential length between a starting position 224 and ending position 226 of the protrusion (e.g. the first circumferential distance 242A added to the second circumferential distance 241A). Further, a peak distance 259 may be a trough amplitude 276 added to the peak amplitude 272. In an embodiment, a peak ratio of protrusion length 253 divided by the peak distance 259 may be between one-hundred ("100") and two ("2").

Figure 8:
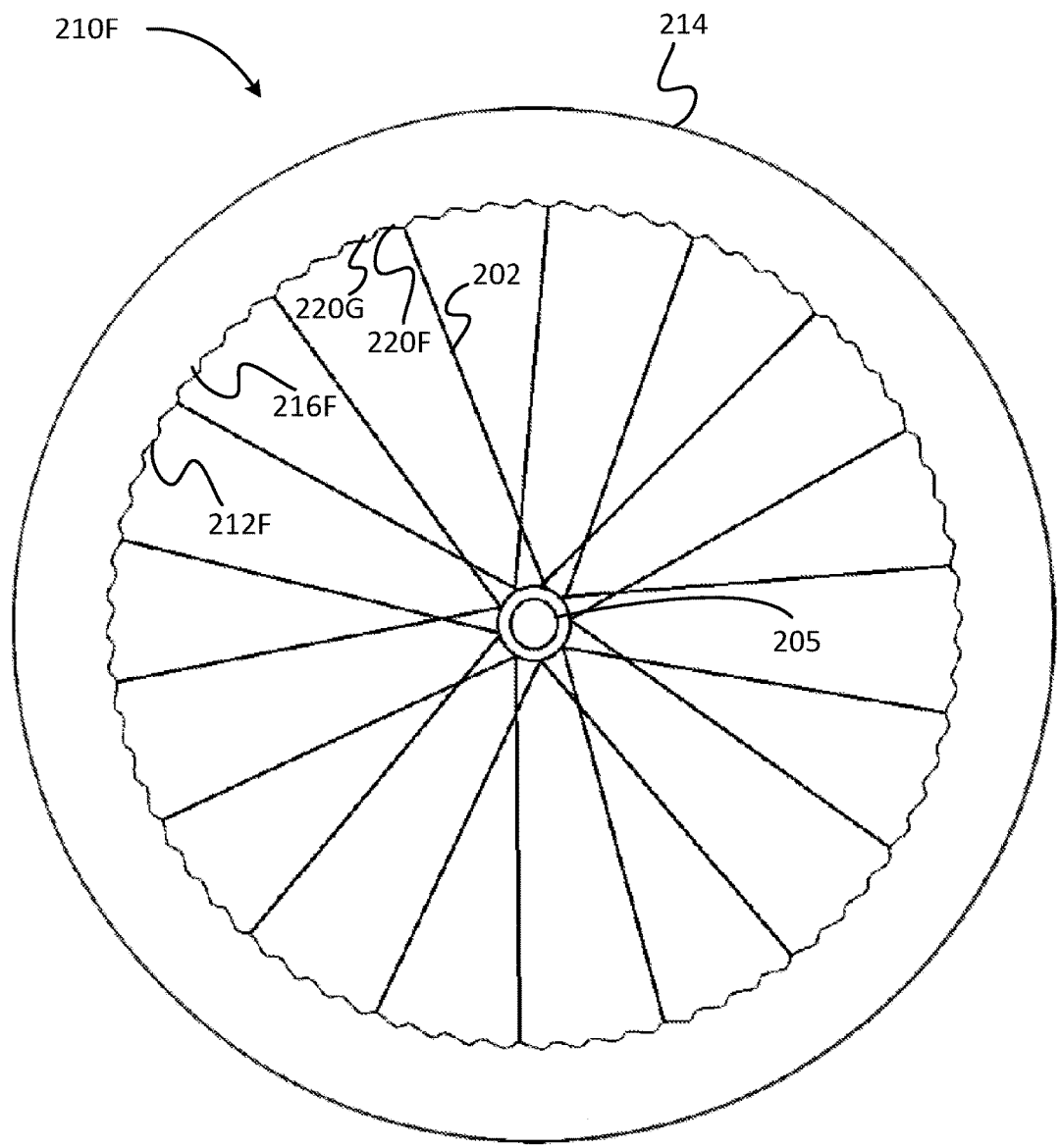
FIG. 8 illustrates a side view of an embodiment of a rim having a plurality of protrusions per spoke of a wheel.

FIG. 8 illustrates an embodiment of a rim 210F with a higher frequency of protrusions 220F than are shown in the embodiment of FIG. 2. The protrusions 220F may be asymmetric as is described herein. This embodiment illustrates a spoke independent configuration of the protrusions 220F. For example, some of the protrusions do not include holes to receive the spokes. A plurality of protrusions 220F, 220G may be included on the spoke receiving surface 216F between each of the spoke 202 reception holes of the rim 210F.

Figure 9:
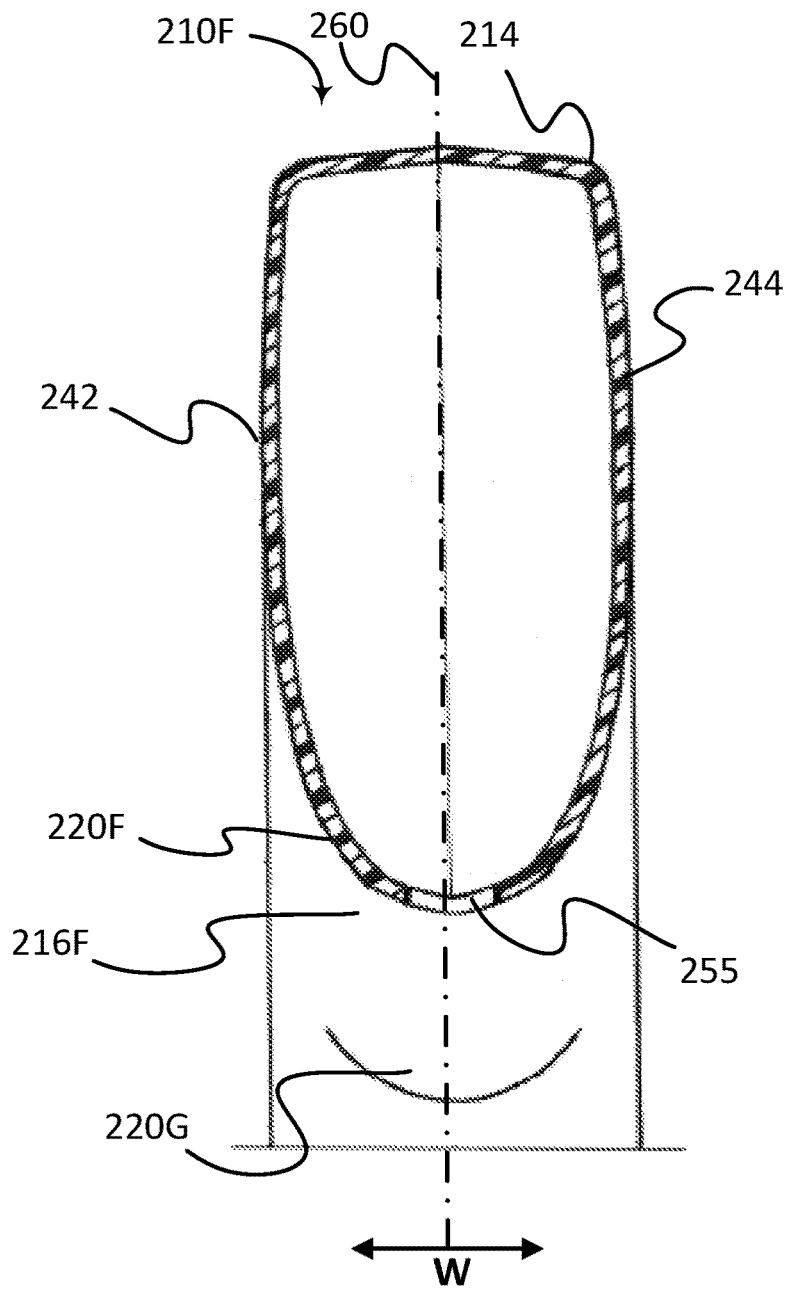
FIG. 9 shows a cross section of the rim of FIG. 8.

FIG. 9 shows a cross section of the rim 210F taken at the spoke hole 255 of protrusion 220F indicated in FIG. 8. A protrusion 220G is located between spoke holes of the rim 210F and does not include a hole for receiving a spoke. The protrusion 220G is also a part of the spoke receiving surface 216F.

A rim for a bicycle wheel includes a radially outer tire-engaging portion, a first sidewall, a second sidewall spaced apart from the first sidewall, the first and second sidewalls extending radially inward of the radially outer tire-engaging portion. The rim also includes a radially inner portion comprising a spoke receiving surface disposed along an inner circumference of the rim, wherein at least one protrusion is formed in the spoke receiving surface asymmetrically about a radial centerline of the at least one protrusion in a circumferential direction of the rim. The at least one protrusion may be a tubercle. The spoke receiving surface including the at least one protrusion may form a convex curve across the width of the spoke receiving surface. The spoke receiving surface may include a plurality of holes configured to receive a plurality of spokes. At least one protrusion may include a hole of the plurality of holes that is configured to receive a spoke of the plurality of spokes. The at least one protrusion may comprise at most one ("1") hole of the plurality of holes. In the embodiment, the at least one protrusion may extend between a first position on the inner circumference of the rim and a second position on the inner circumference of the rim. Further, the protrusion may have a peak position disposed between the first position and the second position. The inner diameter of the inner circumference may have a first radial value at the first position, a second radial value at the second position, and a third radial value at the peak position, the third radial value being less than the first radial value and the second radial value. The third radial value may be a smallest radial value of the inner diameter of the inner circumference of the rim between the first position and the second position. In the embodiment, the peak position may be asymmetrically disposed between the first position and the second position. In an embodiment, a circumferential distance between the first position and the peak position may be a first circumferential distance, a circumferential distance between the second position and the peak position may be a second circumferential distance, and the peak position is disposed such that the first circumferential distance is eighty percent ("80%") or less than the second circumferential distance. In an embodiment the rim has an axial width, and a radial distance of the inner diameter at the spoke receiving surface along the axial width varies continuously and symmetrically about a bisecting plane perpendicular to the axial direction. A peak position of the at least one protrusion may be located within a bisecting plane and/or at an axial centerline of the rim.

In an embodiment, the at least one protrusion is a plurality of protrusions. The plurality of protrusions may be disposed evenly around the inner circumference of the rim.

In an embodiment, the spoke receiving surface may be configured to receive at most one ("1") spoke for every protrusion included therein. In an embodiment, the spoke receiving surface meets the first sidewall and the second sidewall at a base diameter of the rim, and the protrusion includes a peak position having a smallest radial value of the inner diameter along the protrusion, the peak position being a peak distance removed from the base diameter. The at least one protrusion may be a plurality of protrusions disposed continuously around the inner circumference of the rim, each particular protrusion of the plurality of protrusions having a protrusion length along the inner circumference, and each of the plurality of protrusions have a same length and a same peak distance. A peak ratio of protrusion length divided by the peak distance may be between one-hundred ("100") and two ("2").

In an embodiment, the spoke receiving surface is an exterior surface of a spoke engaging portion.

In an embodiment, a wheel for a bicycle includes a central hub configured for rotational attachment to the bicycle and a plurality of spokes attached to the central hub and extending radially outward from the hub, the plurality of spokes consisting of a number of spokes. The wheel also includes a rim having a radially outer tire-engaging portion, a first sidewall, a second sidewall spaced apart from the first sidewall, the first and second sidewalls extending radially inward of the radially outer tire-engaging portion, and a radially inner portion disposed along an inner circumference of the rim comprising a plurality of asymmetric protrusions that protrude inwardly of the rim and are formed in a radially inner surface of the radially inner portion, wherein a quantity of the plurality of asymmetric protrusions is equal to or greater than the number of spokes. The at least one asymmetric protrusion may be formed asymmetrically in a circumferential direction of the rim about a radial centerline of the at least one protrusion. In an embodiment, the radially inner surface forms a convex curve along a width of the rim at the inner circumference.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A rim for a bicycle wheel, the rim comprising:
   a radially outer tire-engaging portion;
   a first sidewall;
   a second sidewall spaced apart from the first sidewall, the first and second sidewalls extending radially inward of the radially outer tire-engaging portion; and
   a radially inner portion comprising a spoke receiving surface disposed along an inner circumference of the rim, the spoke receiving surface comprising at least one protrusion is formed in the spoke receiving surface,
   wherein the at least one protrusion extends between a first position on the inner circumference of the rim and a second position on the inner circumference of the rim and has a peak position disposed between the first position and the second position, the inner diameter of the inner circumference having a first radial value at the first position, a second radial value at the second position, and a third radial value at the peak position, the third radial value being less than the first radial value and the second radial value, and the peak position being disposed about the inner circumference closer to the first position than the second position.

2. The rim of claim 1, wherein the at least one protrusion is a tubercle.

3. The rim of claim 1, wherein the spoke receiving surface including the at least one protrusion forms a convex curve across the width of the spoke receiving surface.

4. The rim of claim 1, wherein the spoke receiving surface comprises a plurality of holes configured to receive a plurality of spokes.

5. The rim of claim 4, wherein the at least one protrusion comprises a hole of the plurality of holes configured to receive a spoke of the plurality of spokes.

6. The rim of claim 5, wherein the at least one protrusion comprises at most one ("1") hole of the plurality of holes.

7. The rim of claim 1, wherein the third radial value is a smallest radial value of the inner diameter of the inner circumference of the rim between the first position and the second position.

8. The rim of claim 1, wherein a circumferential distance between the first position and the peak position is a first circumferential distance, a circumferential distance between the second position and the peak position is a second circumferential distance, and the peak position is disposed such that the first circumferential distance is eighty percent ("80%") or less than the second circumferential distance.

9. The rim of claim 1, wherein the rim has an axial width, and a radial distance of the inner diameter at the spoke receiving surface along the axial width varies continuously and symmetrically about a bisecting plane perpendicular to the axial direction.

10. The rim of claim 9, wherein a peak position of the at least one protrusion is located within the bisecting plane.

11. The rim of claim 1, wherein the at least one protrusion is a plurality of protrusions.

12. The rim of claim 11, wherein the plurality of protrusions are disposed evenly around the inner circumference of the rim.

13. The rim of claim 11, wherein the spoke receiving surface is configured to receive at most one ("1") spoke for every protrusion included therein.

14. The rim of claim 1, wherein the spoke receiving surface meets the first sidewall and the second sidewall at a base diameter of the rim, and the peak position having a smallest radial value of the inner diameter along the protrusion, the peak position being a peak distance removed from the base diameter.

15. The rim of claim 14, wherein the at least one protrusion is a plurality of protrusions disposed continuously around the inner circumference of the rim, each particular protrusion of the plurality of protrusions having a protrusion length along the inner circumference, and each of the plurality of protrusions have a same length and a same peak distance.

16. The rim of claim 15, wherein a peak ratio of protrusion length divided by the peak distance is between one-hundred ("100") and two ("2").

17. The rim of claim 1, wherein the spoke receiving surface is an exterior surface of a spoke engaging portion.

* * * * *